(12) United States Patent
French (10) Patent No.: US 9,170,323 B2
(45) Date of Patent: Oct. 27, 2015

(54) PULSE RADAR RANGE PROFILE MOTION COMPENSATION

(75) Inventor: Andrew French, Winchester (GB)

(73) Assignee: BAE SYSTEMS PLC, London (GB)

( * ) Notice: Subject to any disclaimer, the term of this patent is extended or adjusted under 35 U.S.C. 154(b) by 238 days.

(21) Appl. No.: 13/521,371

(22) PCT Filed: Dec. 21, 2010

(86) PCT No.: PCT/GB2010/052172
§ 371 (c)(1),
(2), (4) Date: Jul. 10, 2012

(87) PCT Pub. No.: WO2011/083300
PCT Pub. Date: Jul. 14, 2011

(65) Prior Publication Data
US 2012/0280851 A1    Nov. 8, 2012

(30) Foreign Application Priority Data

Jan. 11, 2010  (EP) .................................... 10250040
Jan. 11, 2010  (GB) ................................... 1000408.3

(51) Int. Cl.
G01S 13/50   (2006.01)
G01S 7/41    (2006.01)
G01S 13/58   (2006.01)
G01S 13/28   (2006.01)

(52) U.S. Cl.
CPC ................. *G01S 7/415* (2013.01); *G01S 13/28* (2013.01); *G01S 13/505* (2013.01); *G01S 13/588* (2013.01)

(58) Field of Classification Search
CPC ............................... G01S 7/415; G01S 13/588
USPC ....................................................... 342/105
See application file for complete search history.

(56) References Cited

U.S. PATENT DOCUMENTS 5,229,775 A   7/1993   Sakamoto et al.
5,309,161 A   5/1994   Urkowitz et al.
5,631,653 A   5/1997   Reedy

FOREIGN PATENT DOCUMENTS

GB         2 298 538 A      9/1996
WO       WO 00/04401 A1     1/2000
WO     WO 2005/050240 A2    6/2005

OTHER PUBLICATIONS

International Preliminary Report on Patentability and Written Opinion, dated Jul. 26, 2012 from related International Application No. PCT/GB2010/052172.
International Search Report dated Feb. 15, 2011 issued in PCT/GB2010/052172.
Extended European Search Report dated Jun. 18, 2010 issued in EP 10250040.2.
UK Search Report dated May 11, 2010 issued in GB1000408.3.

*Primary Examiner* — Matthew M Barker
(74) *Attorney, Agent, or Firm* — Scully, Scott, Murphy & Presser P.C.

(57) ABSTRACT

A pulse radar range profile motion compensation method (10) comprises: acquiring receiver samples (12); acquiring an estimate of the range rate of a target (14); removing an additional phase acquired by the echo signals; removing a shift in range cells of the receiver samples (18); applying a pulse Doppler filter (22); identifying the peak Doppler frequency and calculating a shift from zero of the peak Doppler frequency (24); calculating a range rate correction (26); adding the range rate correction to the estimate of the range rate and repeating the removal of the additional phase (16) and the shift in range cells (18), and using the new range rate estimate to obtain motion compensated receiver samples (28); and generating an output signal indicative of the motion compensated receiver samples for generating a range profile (30).

16 Claims, 5 Drawing Sheets

PULSE RADAR RANGE PROFILE MOTION COMPENSATION

The invention relates to a pulse radar range profile motion compensation method and to a method of providing a radar range profile of a moving target.

There is a need for radar systems to offer non-cooperative target recognition (NCTR) capability, in order to enable rapid and reliable identification of targets. In practical terms, this consists of a capability to generate High Range Resolution (HRR) profiles of targets that are already being tracked. Feature extraction algorithms can then be applied to the HRR profiles, which enable a classifier to identify a target in conjunction with a database of known targets. The success of NCTR capabilities is very much dependent on the quality of the HRR profiles obtained for both reference targets and during operation.

For a moving target, the motion of the target must be corrected for prior to generating an HRR profile otherwise the effect of the motion of the target on the radar echo signals will result in the HRR profile being corrupted. Effects observed in HRR profile of moving targets typically involve combinations of peak broadening (which leads to loss of resolution), range shifting of peaks and loss of dynamic range. Since the target is already being tracked one method of compensating for the motion of the target involves obtaining an estimate of the target range rate from the radar tracker and using the range rate estimate to apply motion compensation to receiver samples obtained from the radar echo signals. However, even a slightly incorrect target range rate can result in significant corruption of the HRR profile of the target.

It is an object to provide an improved method of motion compensation for pulse radar range profiles. It is a further object to provide an improved method of providing a radar range profile of a moving target.

According to a first aspect of the invention there is provided a pulse radar range profile motion compensation method comprising:
  i. acquiring receiver samples of radar echo signals generated by a target moving at a range rate, $\dot{R}$, and illuminated during a look by a pulse radar signal having a carrier frequency, $f_{Tx}$, and comprising a plurality, P, of pulses having a pulse repetition frequency, $f_{PRF}$;
  ii. acquiring an estimate of the range rate of the target;
  iii. removing an additional phase acquired by the echo signals in dependence on the range rate and a time to a pulse since the start of the look;
  iv. removing a shift in range cells of the receiver samples in dependence on the range rate and a time to a pulse since the start of the look;
  v. applying a pulse Doppler filter to the receiver samples;
  vi. identifying the peak Doppler frequency corresponding to a skin return of the target and calculating a shift from zero, $f_p$, of the peak Doppler frequency;
  vii. calculating a range rate correction $\Delta \upsilon$ as $$\Delta \upsilon \approx \frac{-cf_D}{2f_{Tx}};$$

viii. adding the range rate correction to the estimate of the range rate to obtain a new range rate estimate and repeating steps iii. and iv. using the new range rate estimate to obtain motion compensated receiver samples; and
  ix. generating an output signal indicative of the motion compensated receiver samples for generating a range profile.

The method is thus able to provide a range rate correction to the target range rate enabling improved motion compensation to be applied to the receiver samples.

Preferably, the pulse radar signal comprises a frequency coded waveform and following step iv. the method further comprises applying a pulse compression to the receiver samples, identifying a range cell corresponding to a maximum power of the pulse compressed receiver samples and, for each pulse, selecting a receiver sample corresponding to the identified range cell.

Preferably, the maximum power is identified across all pulses, all frequency steps and all receiver samples. This takes account of any potential interference effects between multiple scatterers in the target which may produce a null at a particular frequency step.

The estimate of the range rate of the target is preferably acquired from a radar tracker tracking the target. A good, real-time estimate of the target range rate can therefore be provided.

Preferably, step iii. comprises applying a complex multiplication of $$\exp\left(\frac{4\pi f_{Tx}}{c} t_p \dot{R}\right),$$

where $t_p$ is the time of a pulse p since the start of the look, to the receiver samples.

Preferably, step iv. comprises generating a Fourier transform of the receiver samples of step iii. and multiplying the Fourier transform by a phase ramp corresponding to the target range shift, $\frac{1}{2} t_p \dot{R}$, since the start of the look and subsequently generating an inverse Fourier transform of the Fourier transformed receiver samples. A range walk correction of less than a whole range cell can thus be applied.

In step v., the Doppler filter preferably comprises outputs at Doppler frequencies in the range $-\frac{1}{2} f_{PRF}$ to $\frac{1}{2} f_{PRF}$ and spaced by $$\frac{f_{PRF}}{P}.$$

Step v. preferably comprises multiplying the receiver samples by a windowing function and generating a Fourier transform of the resulting receiver samples. Preferably, the windowing function comprises a low sidelobe Dolph-Chebychev windowing function.

Preferably, the Fourier transforms comprise discrete Fourier transforms.

Preferably, the magnitude of the range rate correction, $\Delta \upsilon$, does not exceed $$\frac{cf_{PRF}}{2Pf_{Tx}}.$$

The radar signal preferably comprises a stepped-frequency waveform comprising a second plurality, Q, of frequency steps, each frequency step comprising a said plurality, P, of pulses. The motion compensation is thus able to be performed within a single frequency step.

Preferably, step iii. comprises applying a complex multiplication of $$\exp\left(\frac{4\pi f_{Tx}}{c} t_{pq} \dot{R}\right),$$

where $t_{pq}$ is the time of a pulse p of a frequency step q since the start of the look, to the receiver samples.

Preferably, step iv. comprises multiplying the Fourier transform by a phase ramp corresponding to the target range shift, $\frac{1}{2} t_{pq} \dot{R}$, since the start of the look.

Preferably step v. further comprises averaging the Doppler filter output over the frequency steps and step vi. comprises identifying the peak Doppler frequency by interpolating the averaged Doppler filter output in the region $$-\frac{2 f_{PRF}}{P} \text{ to } \frac{2 f_{PRF}}{P}.$$

Looking for the peak Doppler frequency in this restricted region reduces the possibility of the peak Doppler frequency being incorrectly identified as a jet engine modulation Doppler frequency in the Doppler filter output.

Step viii., preferably comprises:
a) adding the range rate correction to the estimate of the range rate to obtain a new range rate estimate;
b) repeating steps iii. to vii. using the new range rate estimate and a) one or more times to produce a final range rate correction;
c) adding the final range rate correction to the estimate of the range rate to obtain a final range rate estimate; and
d) repeating steps iii. and iv. using the final range rate estimate to obtain motion compensated receiver samples.

The range rate correction can therefore be iteratively determined to obtain a more accurate range rate estimate.

According to a second aspect of the present invention there is provided a method of providing a radar range profile of a moving target, the method comprising:
a. generating and transmitting a pulse radar signal to the target, the pulse radar signal having a carrier frequency, $f_{Tx}$, and comprising a plurality, P, of pulses having a pulse repetition frequency, $f_{PRF}$;
b. receiving corresponding radar echo signals from the target and sampling the echo signals to generate receiver samples corresponding to the pulses;
c. acquiring an estimate of the range rate of the target;
d. removing an additional phase acquired by the echo signals in dependence on the range rate and a time to a pulse since the start of the look;
e. removing a shift in range cells of the receiver samples in dependence on the range rate and a time to a pulse since the start of the look;
f. applying a pulse Doppler filter to the receiver samples from step e.;
g. identifying the peak Doppler frequency corresponding to a skin return of the target and calculating a shift from zero, $f_D$, of the peak Doppler frequency;
h.
i. calculating a range rate correction $\Delta \upsilon$ as $$\Delta \upsilon \approx \frac{-c f_D}{2 f_{Tx}};$$

j. adding the range rate correction to the estimate of the range rate to obtain a new range rate estimate and repeating steps d. and e. to obtain motion compensated receiver samples; and
k. generating a high range resolution profile of the target from the motion compensated receiver samples.

The method enables a radar range profile to be generated of a moving target with improved motion compensation and therefore less corruption in the HRR profile.

Preferably, the pulse radar signal comprises a frequency coded waveform and following step e. the method further comprises applying a pulse compression to the receiver samples, identifying a range cell corresponding to a maximum power of the pulse compressed receiver samples and, for each pulse, selecting a receiver sample corresponding to the identified range cell.

Preferably, the maximum power is identified across all pulses, all frequency steps and all receiver samples. This takes account of any potential interference effects between multiple scatterers in the target which may produce a null at a particular frequency step.

The estimate of the range rate of the target is preferably acquired from a radar tracker tracking the target. A good, real-time estimate of the target range rate can therefore be provided.

Preferably, step d. comprises applying a complex multiplication of $$\exp\left(\frac{4\pi f_{Tx}}{c} t_{p} \dot{R}\right),$$

where $t_p$ is the time of a pulse p since the start of the look, to the receiver samples.

Preferably, step e. comprises generating a Fourier transform of the receiver samples of step d. and multiplying the Fourier transform by a phase ramp corresponding to the target range shift, $\frac{1}{2} t_p \dot{R}$, since the start of the look and subsequently generating an inverse Fourier transform of the Fourier transformed receiver samples. A range walk correction of less than a whole range cell can thus be applied.

In step f., the Doppler filter preferably comprises outputs at Doppler frequencies in the range $-\frac{1}{2} f_{PRF}$ to $\frac{1}{2} f_{PRF}$ and spaced by $$\frac{f_{PRF}}{P}.$$

Step g. preferably comprises multiplying the receiver samples by a windowing function and generating a Fourier transform of the resulting receiver samples. Preferably, the windowing function comprises a low sidelobe Dolph-Chebychev windowing function.

Preferably, the Fourier transforms comprise discrete Fourier transforms.

Preferably, the magnitude of the range rate correction, $\Delta \upsilon$, does not exceed $$\frac{c f_{PRF}}{2 P f_{Tx}}.$$

The pulse radar signal preferably comprises a stepped-frequency waveform comprising a second plurality, Q, of frequency steps, each frequency step comprising a said plurality, P, of pulses. The motion compensation is thus able to be performed within a single frequency step.

Preferably, step d. comprises applying a complex multiplication of $$\exp\left(\frac{4\pi f_{Tx}}{c} t_{pq} \dot{R}\right),$$

where $t_{pq}$ is the time of a pulse p of a frequency step q since the start of the look, to the receiver samples.

Preferably, step e. comprises multiplying the Fourier transform by a phase ramp corresponding to the target range shift, $\frac{1}{2} t_{pq} \dot{R}$, since the start of the look.

Preferably step f. further comprises averaging the Doppler filter output over the frequency steps and step g. comprises identifying the peak Doppler frequency by interpolating the averaged Doppler filter output in the region $$-\frac{2 f_{PRF}}{P} \text{ to } \frac{2 f_{PRF}}{P}.$$

Looking for the peak Doppler frequency in this restricted region reduces the possibility of the peak Doppler frequency being incorrectly identified as a jet engine modulation Doppler frequency in the Doppler filter output.

Step i., preferably comprises:
1. adding the range rate correction to the estimate of the range rate to obtain a new range rate estimate;
2. repeating steps d. to h. using the new range rate estimate and 1. one or more times to produce a final range rate correction;
3. adding the final range rate correction to the estimate of the range rate to obtain a final range rate estimate; and
4. repeating steps d. and e. using the final range rate estimate to obtain motion compensated receiver samples.

The range rate correction can therefore be iteratively determined to obtain a more accurate range rate estimate and an improved HRR profile can be provided.

Embodiments of the invention will now be described in detail, by way of example only, with reference to the accompanying drawings, in which:

FIG. 3 shows (a) a Doppler filter output of receiver samples from a target illuminated with a frequency coded waveform pulse radar signal comprising 32 frequency steps of 32 pulses and (b) a high resolution range (HRR) profile of the target generated from the receiver samples, without motion compensation;

FIG. 4 shows (a) a Doppler filter output of receiver samples from a target illuminated with a pulse radar signal comprising 32 frequency steps of 32 pulses and (b) a high resolution range (HRR) profile of the target generated from the receiver samples, with motion compensation applied.

Figure 1:
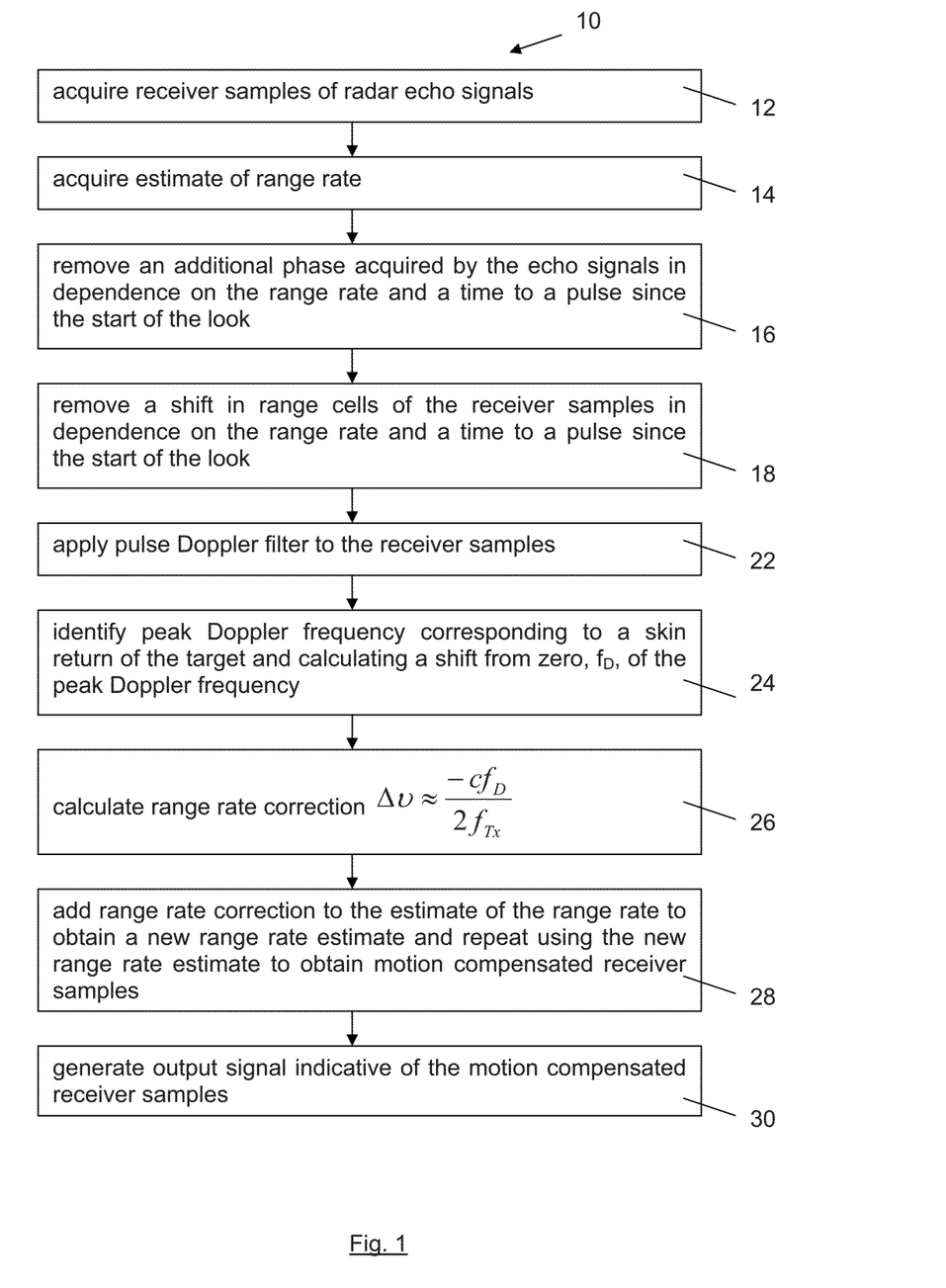
FIG. 1 shows the steps of a pulse radar range profile motion compensation method according to a first embodiment of the invention.

A first embodiment of the invention provides a pulse radar range profile motion compensation method 10 having the steps shown in FIG. 1.

The method 10 comprises:
i. acquiring receiver samples of radar echo signals 12 generated by a target moving at a range rate, $\dot{R}$, and illuminated during a look by a pulse radar signal having a carrier frequency, $f_{Tx}$, and comprising a plurality, P, of pulses having a pulse repetition frequency, $f_{PRF}$;
ii. acquiring an estimate of the range rate of the target 14;
iii. removing an additional phase acquired by the echo signals in dependence on the range rate and a time to a pulse since the start of the look 16;
iv. removing a shift in range cells of the receiver samples in dependence on the range rate and a time to a pulse since the start of the look 18;
v. applying a pulse Doppler filter to the receiver samples from step iv. 22;
vi. identifying the peak Doppler frequency corresponding to a skin return of the target and calculating a shift from zero, $f_D$, of the peak Doppler frequency 24;
vii. calculating a range rate correction $\Delta v$ as $$\Delta v \approx \frac{-c f_D}{2 f_{Tx}} 26;$$

viii. adding the range rate correction to the estimate of the range rate to obtain a new range rate estimate and repeating steps iii. and iv. using the new range rate estimate to obtain motion compensated receiver samples 28; and
ix. generating an output signal indicative of the motion compensated receiver samples for generating a range profile 30.

It will be appreciated that the method 10 may be used to effect motion compensation for a moving target illuminated with any pulse radar signal for which the carrier frequency and phase do not vary over the pulses, P, used to implement the method 10. The method 10 may be used for both short pulses and frequency coded waveforms.

Figure 2:
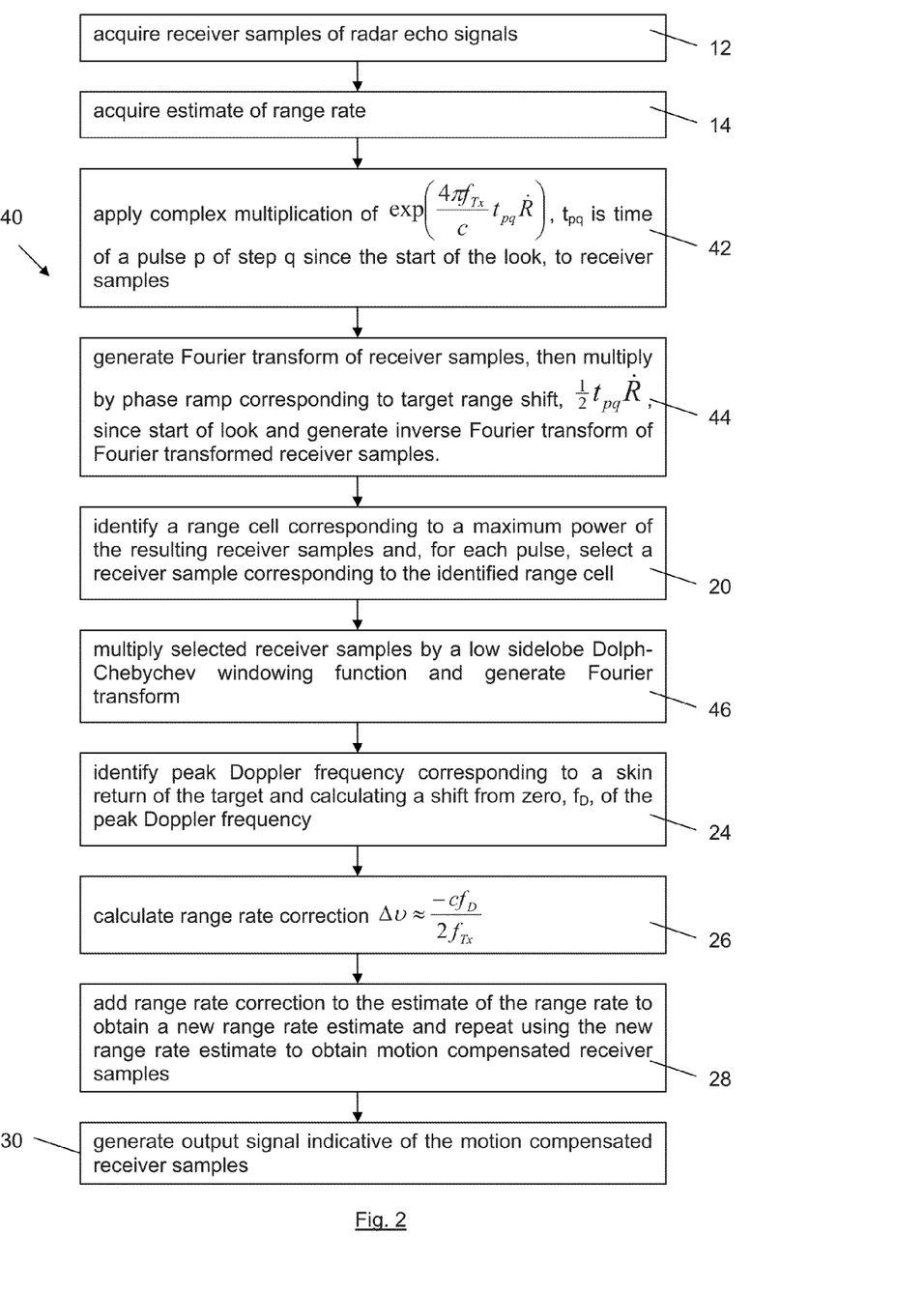
FIG. 2 shows the steps of a pulse radar range profile motion compensation method according to a second embodiment of the invention.

A second embodiment of the invention provides a pulse radar range profile motion compensation method 40 having the steps shown in FIG. 2. The method 40 is substantially the same as the method 10 of FIG. 1, with the following modifications. The same reference numbers are retained for corresponding features.

In this embodiment, the radar signal comprises a stepped-frequency signal comprising a second plurality, Q, of frequency steps, each comprising the said plurality, P, of pulses. The radar signal comprises a frequency coded waveform in this example, with the pulses being chirp pulses. The receiver samples comprise complex receiver samples.

The motion compensation method 40 is performed on the pulses of a single frequency step.

The range rate estimate is acquired from a radar tracker unit, which will typically provide a range rate estimate that is correct to within a few meters per second.

Step iii. comprises applying a complex multiplication 42 of $$\exp\left(\frac{4\pi f_{Tx}}{c} t_{pq} \dot{R}\right)$$

to the receiver samples. $t_{pq}$ identifies a pulse a pulse p of the said plurality, P, of pulses of a frequency step q of the second plurality, Q, of frequency steps in terms of the timing of pulse since the start of the look. This corrects for phase walk of the pulses.

Step iv. comprises multiplying the Fourier transform resulting from step iii. by a phase ramp corresponding to the target range shift, $\frac{1}{2}t_{pq}\dot{R}$, or a pulse p of frequency step q since the start of the look 44. This corrects for range walk of the receiver samples and enables range walk of less than a whole range cell to be corrected for.

Following step iv. the method 40 of this embodiment further comprises applying a pulse compression to the receiver samples. This signal processing method will be well know to the person skilled in the art and so it will not be described in detail here. The method 40 further comprises identifying a range cell corresponding to a maximum power of the pulse compressed receiver samples and, for each pulse, selecting a receiver sample corresponding to the identified range cell 20.

The maximum power is taken over all pulses, all frequency steps and all receiver samples to take account of any interference effects between multiple scatterers in the target which can result in a null at a particular frequency step. For each pulse and frequency step a receiver sample is selected from the vector of receiver samples at the range cell corresponding to the maximum power. The selected samples are formed into a P×Q matrix.

The Doppler filtering step 46 of this embodiment comprises multiplying the matrix of receiver samples by a windowing function and subsequently generating a Fourier transform of the resulting windowed set of receiver samples. The windowing function comprises a Dolph-Chebychev windowing function having low sidelobes, of the order of 40 dB. The Doppler filter provides outputs at Doppler frequencies in the range $-\frac{1}{2} f_{PRF}$ to $\frac{1}{2} f_{PRF}$ and spaced by $$\frac{f_{PRF}}{P}.$$

The Doppler filter output is averaged over the frequency steps and the peak Doppler frequency is identified 24 by interpolating the averaged Doppler filter output in the region $$-\frac{2f_{PRF}}{P} \text{ to } \frac{2f_{PRF}}{P}.$$

Looking for the peak Doppler frequency in this restricted region reduces the possibility of the peak Doppler frequency being incorrectly identified as a jet engine modulation (JEM) Doppler frequency in the Doppler filter output.

Within the selected region the peak Doppler frequency is assumed to correspond to the skin return of the target and therefore the peak Doppler frequency can be used to determine the range rate correction.

Step viii. corresponds to a single iteration of calculating a range rate correction and a corrected range rate estimate. The method 40 may be extended to include one or more additional iterations, with the following steps:
  a) adding the range rate correction to the estimate of the range rate to obtain a new range rate estimate;
  b) repeating steps iii. to vii. using the new range rate estimate and a) one or more times to produce a final range rate correction;
  c) adding the final range rate correction to the estimate of the range rate to obtain a final range rate estimate; and
  d) repeating steps iii. and iv. using the final range rate estimate to obtain motion compensated receiver samples.

The range rate correction can therefore be iteratively determined to obtain a more accurate range rate estimate.

The receiver samples form a discrete series and it will therefore be appreciated that discrete Fourier transforms and inverse discrete Fourier transforms are used.

Figure 3:
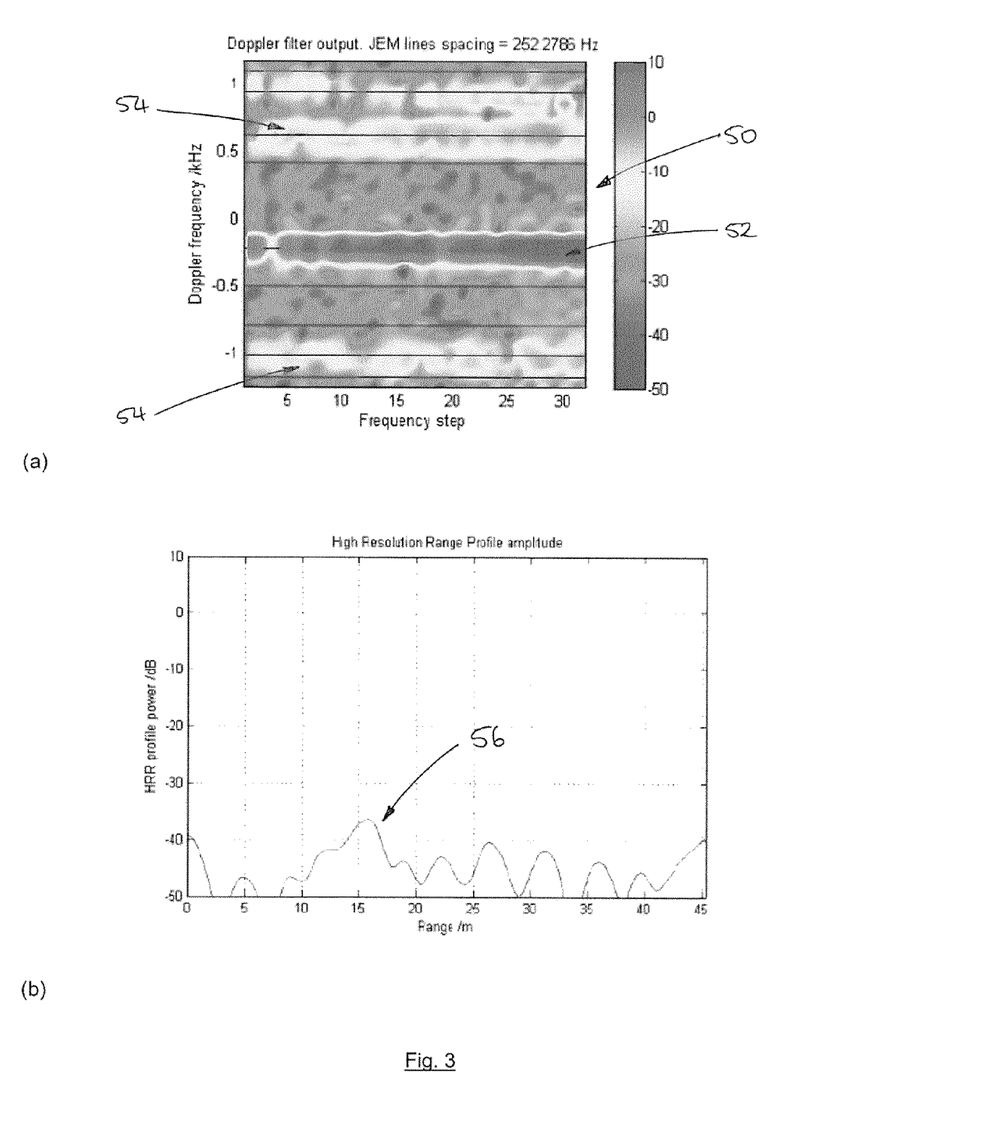
Figure 4:
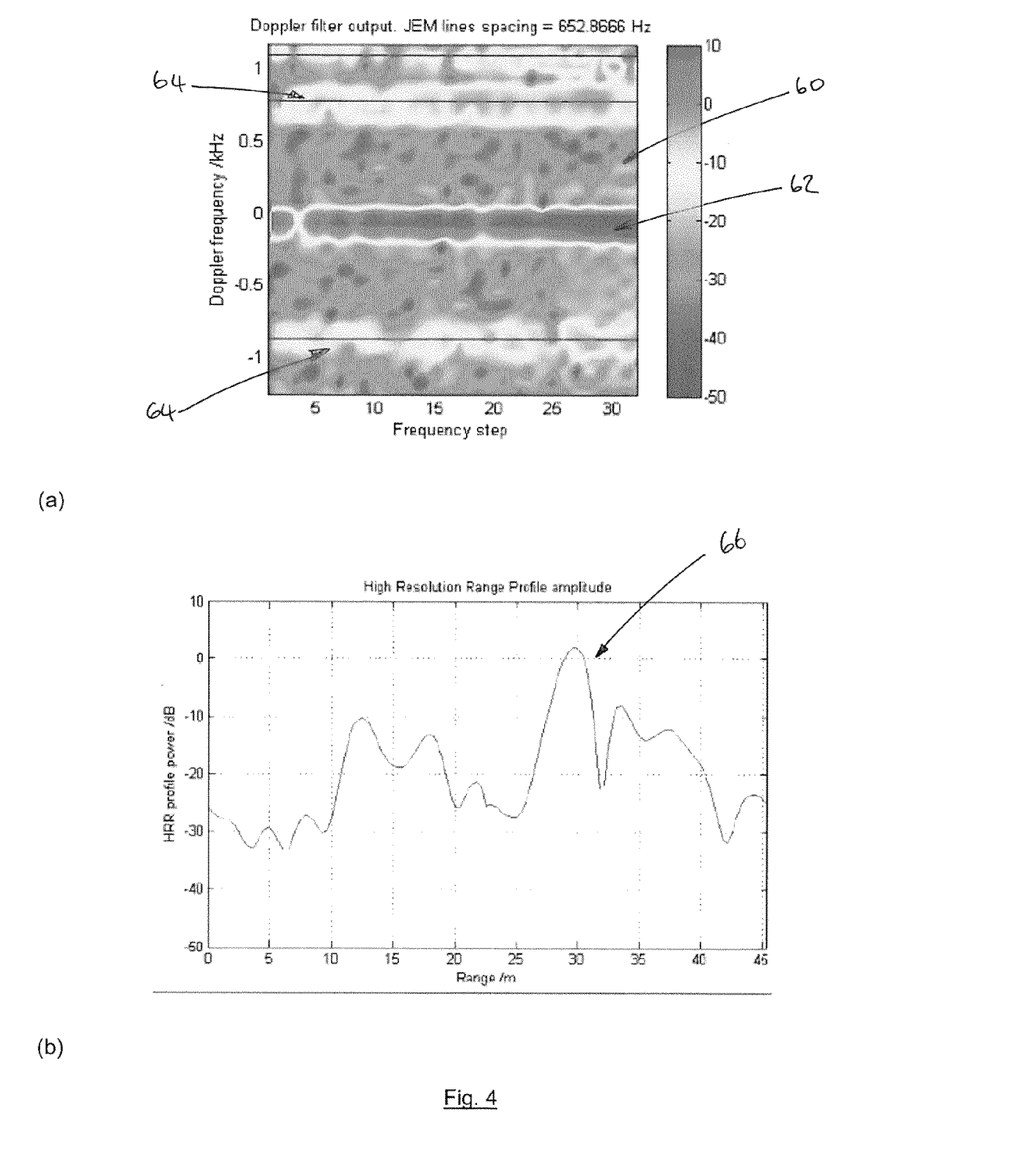

FIGS. 3 and 4 illustrate the improvement in an HRR profile which may be obtained by using the method 40. In this example, a moving target is illuminated in both instances with a stepped-frequency pulse radar signal having a starting carrier frequency, $f_{Tx}$, of 2708.2 MHz, a frequency step, $\Delta f$, of 3.2 MHz, and a pulse repetition frequency, $f_{PRF}$, of 2.5 kHz. The pulse radar signal comprises 32 frequency steps, Q, each comprising 32 pulses, P, each pulse having a chirp bandwidth, B, of −4.5 MHz and a duration, τ, of 25.6 μs.

FIG. 3(a) shows the Doppler filter output 50 from step v., the receiver samples being processed by applying steps i. to v. and ix., i.e. the steps of the method 40 without applying steps vi. to viii. to calculate a range rate correction. It can be seen that the skin return 52 is offset from 0 Hz, which is where the skin return would be located if the target was not moving. JEM lines 54 are clearly visible above and below the skin return.

FIG. 3(b) shows a Classical HRR profile 56 obtained from the receiver samples obtained after the Doppler filtering step. As can be seen, the HRR profile is significantly degraded. The method of producing a Classical HRR profile will be well known to the person skilled in the art and so it will not be described in detail here.

FIG. 4(a) shows the Doppler filter output 60 from step v. following application of steps i. to viii. of the method 40, that is to say, following correction of the range rate estimate. The skin return 62 is clearly centred about 0 Hz. JEM lines 64 are again visible above and below the skin return.

FIG. 4(b) shows a Classical HRR profile 66 generated from the output signal of step ix. of the method 40. As can be seen, the HRR profile is much improved as compared to that shown in FIG. 3(b) and the method 40 has clearly compensated for bulk motion of the target.

Figure 5:
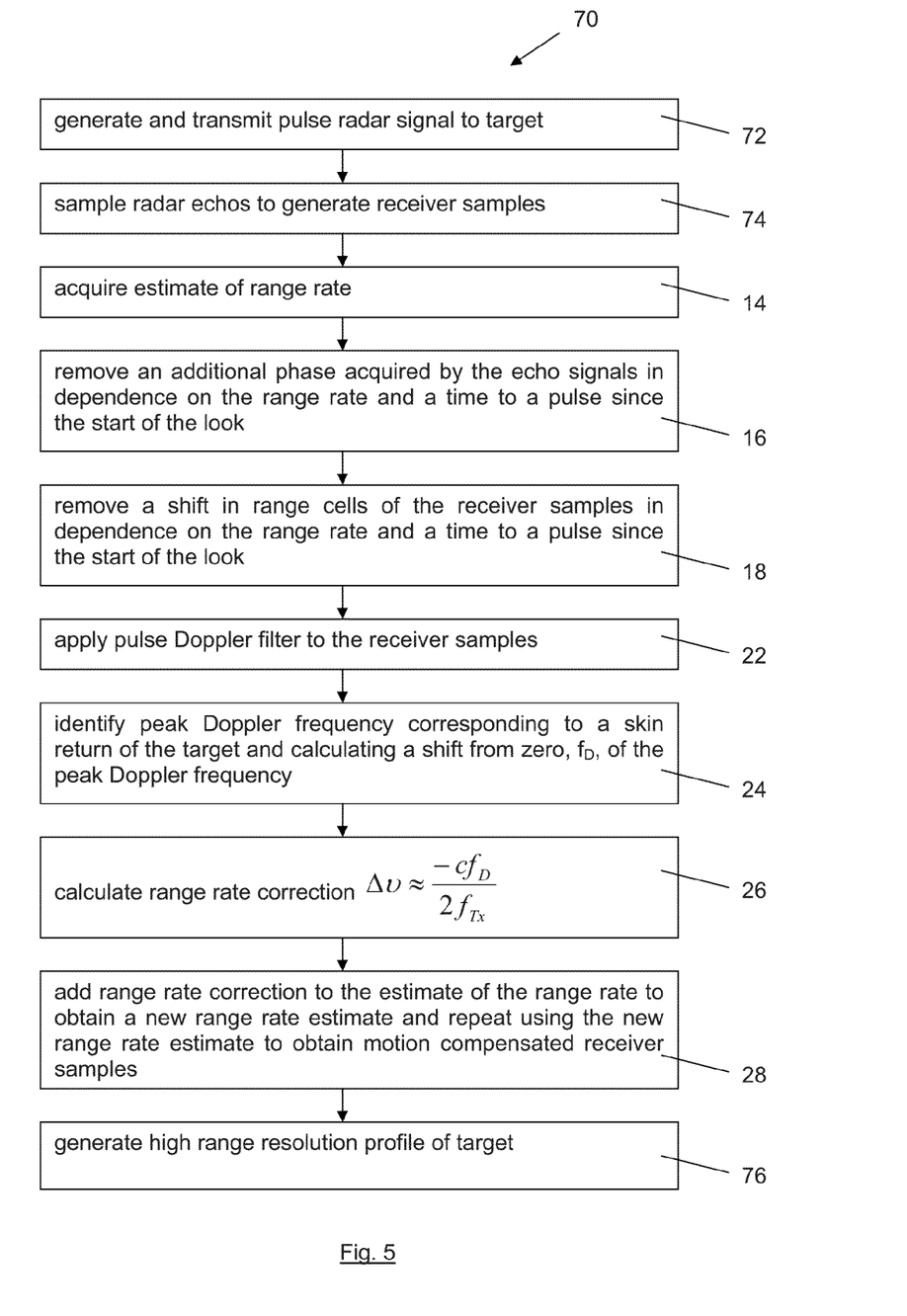
FIG. 5 shows the steps of a method of providing a radar range profile of a target according to a third embodiment of the invention.

The steps of a method 70 of providing a radar range profile of a moving target according to third embodiment of the invention are shown in FIG. 5. The method 70 comprises many of the steps of the pulse radar range profile motion compensation method 10 of FIG. 1 and the same reference numbers are retained for corresponding steps.

The method 70 comprises the steps:
  a. generating and transmitting a pulse radar signal to the target 72, the pulse radar signal having a carrier frequency, $f_{Tx}$, and comprising a plurality, P, of pulses having a pulse repetition frequency, $f_{PRF}$;
  b. receiving corresponding radar echo signals from the target and sampling the echo signals to generate receiver samples corresponding to the pulses 74;
  c. acquiring an estimate of the range rate of the target 14;
  d. removing an additional phase acquired by the echo signals in dependence on the range rate and a time to a pulse since the start of the look 16;
  e. removing a shift in range cells of the receiver samples in dependence on the range rate and a time to a pulse since the start of the look 18;
  f. applying a pulse Doppler filter to the receiver samples from step e. 22;
  g. identifying the peak Doppler frequency corresponding to a skin return of the target and calculating a shift from zero, $f_p$, of the peak Doppler frequency 24;

h. calculating a range rate correction $\Delta\upsilon$ as $$\Delta\upsilon \approx \frac{-cf_D}{2f_{Tx}} 26;$$

i. adding the range rate correction to the estimate of the range rate to obtain a new range rate estimate and repeating steps d. and e. to obtain motion compensated receiver samples 28; and j. generating a high range resolution profile of the target from the motion compensated receiver samples 76.

It will be appreciated that the method 70 of this embodiment may alternatively comprise the steps of the pulse radar range profile motion compensation method 40 of FIG. 2.

The method 70 of this embodiment is used to generate the HRR profile of FIG. 4(*b*).

The invention claimed is:

1. A pulse radar range profile motion compensation method implemented by a radar system comprising a processor, a radar transmitter and a radar receiver, the method comprising:

i. acquiring, from the radar receiver, samples of radar echo signals generated by a target moving at a range rate, $\dot{R}$, and illuminated during a look by a pulse radar signal, transmitted from the radar transmitter having a carrier frequency, $f_{Tx}$, and comprising a plurality, P, of pulses having a pulse repetition frequency, $f_{PRF}$;

ii. acquiring from a radar tracker tracking the target an estimate of the range rate of the target;

iii. removing, using the processor, an additional phase acquired by the echo signals in dependence on the estimated range rate and a time to a pulse since the start of the look;

iv. removing, using the processor, a shift in range cells of the receiver samples in dependence on the estimated range rate and a time to a pulse since the start of the look;

v. applying, using the processor, a pulse Doppler filter to the receiver samples from step iv;

vi. identifying, using the processor, the peak Doppler frequency corresponding to a skin return of the target and calculating a shift from zero, $f_D$, of the peak Doppler frequency;

vii. calculating, using the processor, a range rate correction $\Delta\upsilon$ as $$\Delta\upsilon \approx \frac{-cf_D}{2f_{Tx}};$$

viii. adding, using the processor, the range rate correction to the estimate of the range rate to obtain a new range rate estimate and repeating steps iii. and iv. using the new range rate estimate to obtain motion compensated receiver samples; and ix. generating, using the processor, an output signal indicative of the motion compensated receiver samples for generating a range profile.

2. A pulse radar range profile motion compensation method as claimed in claim 1, wherein the pulse radar signal comprises a frequency coded waveform and following step iv. the method further comprises applying a pulse compression to the receiver samples, identifying a range cell corresponding to a maximum power of the pulse compressed receiver samples and, for each pulse, selecting a receiver sample corresponding to the identified range cell.

3. A pulse radar range profile motion compensation method as claimed in claim 2, wherein the radar signal comprises a stepped-frequency waveform comprising a second plurality, Q, of frequency steps, each frequency step comprising a said plurality, P, of pulses.

4. A pulse radar range profile motion compensation method as claimed in claim 3, wherein step iii. comprises applying a complex multiplication of $$\exp\left(\frac{4\pi f_{Tx}}{c} t_{pq} \dot{R}\right),$$

where $t_{pq}$ is the time of a pulse p of a frequency step q since the start of the look, to the receiver samples.

5. A pulse radar range profile motion compensation method as claimed in claim 3, wherein step iv. comprises generating a Fourier transform of the receiver samples of step iii and multiplying the Fourier transform of the receiver samples by a phase ramp corresponding to the target range shift, $½t_{pq}\dot{R}$, since the start of the look, where $t_{pq}$ is the time of a pulse p of a frequency step q since the start of the look.

6. A pulse radar range profile motion compensation method as claimed in claim 3, wherein the maximum power is identified across all pulses, all frequency steps and all receiver samples.

7. A pulse radar range profile motion compensation method as claimed in claim 3, wherein step v. further comprises averaging the Doppler filter output over the frequency steps and step vi. comprises identifying the peak Doppler frequency by interpolating the averaged Doppler filter output in the region $$-\frac{2f_{PRF}}{P} \text{ to } \frac{2f_{PRF}}{P}.$$

8. A pulse radar range profile motion compensation method as claimed in claim 1, wherein step iii. comprises applying a complex multiplication of $$\exp\left(\frac{4\pi f_{Tx}}{c} t_p \dot{R}\right),$$

where $t_p$ is the time of a pulse p since the start of the look, to the receiver samples.

9. A pulse radar range profile motion compensation method as claimed in claim 1, wherein step iv. comprises generating a Fourier transform of the receiver samples of step iii. and multiplying the Fourier transform of the receiver samples by a phase ramp corresponding to the target range shift, $½t_p\dot{R}$, since the start of the look and subsequently generating an inverse Fourier transform of the Fourier transformed receiver samples, where $t_p$ is the time of a pulse p since the start of the look.

10. A pulse radar range profile motion compensation method as claimed in claim 9, wherein the Fourier transform comprises a discrete Fourier transform.

11. A pulse radar range profile motion compensation method as claimed in claim 1, wherein in step v., the Doppler filter comprises outputs at Doppler frequencies in the range $-½f_{PRF}$ to $½f_{PRF}$ and spaced by $$\frac{f_{PRF}}{P}.$$

12. A pulse radar range profile motion compensation method as claimed in claim 11, wherein step v. comprises multiplying the receiver samples by a windowing function and generating a Fourier transform of the resulting receiver samples.

13. A pulse radar range profile motion compensation method as claimed in claim 12, wherein the windowing function comprises a low sidelobe Dolph-Chebychev windowing function.

14. A pulse radar range profile motion compensation method as claimed in claim 1, wherein the range rate correction, $\Delta v$, does not exceed $$\frac{cf_{PRF}}{2Pf_{Tx}}.$$

15. A pulse radar range profile motion compensation method as claimed in claim 1, wherein step viii. comprises:
   a) adding the range rate correction to the estimate of the range rate to obtain a new range rate estimate;
   b) repeating steps iii. to vii. using the new range rate estimate and a) one or more times to produce a final range rate correction;
   c) adding the final range rate correction to the estimate of the range rate to obtain a final range rate estimate; and
   d) repeating steps iii. and v. using the final range rate estimate to obtain motion compensated receiver samples, wherein the range rate correction is iteratively determined to obtain a more accurate range rate estimate.

16. A method of providing a radar range profile of a moving target implemented by a radar system comprising a processor, a radar transmitter and a radar receiver, the method comprising:

a. generating and transmitting a pulse radar signal from the radar transmitter to the target, the pulse radar signal having a carrier frequency, $f_{Tx}$, and comprising a plurality, P, of pulses having a pulse repetition frequency, $f_{PRF}$;
b. receiving corresponding radar echo signals from the target by the radar receiver and sampling the echo signals to generate receiver samples corresponding to the pulses;
c. acquiring from a radar tracker tracking the target an estimate of the range rate of the target;
d. removing, using the processor, an additional phase acquired by the echo signals in dependence on the estimated range rate and a time to a pulse since the start of the look;
e. removing, using the processor, a shift in range cells of the receiver samples in dependence on the estimated range rate and a time to a pulse since the start of the look;
f. applying, using the processor, a pulse Doppler filter to the selected receiver samples from step e.;
g. identifying, using the processor, the peak Doppler frequency corresponding to a skin return of the target and calculating a shift from zero, $f_D$, of the peak Doppler frequency;
h. calculating, using the processor, a range rate correction $\Delta v$, as $$\Delta v \approx \frac{-cf_D}{2f_{Tx}};$$

i. adding, using the processor, the range rate correction to the estimate of the range rate to obtain a new range rate estimate and repeating steps d. and e. to obtain motion compensated receiver samples; and
j. generating, using the processor, a high range resolution profile of the target from the motion compensated receiver samples, wherein the target is identified based on the high range resolution profile.

\* \* \* \* \*